(12) United States Patent
Weightman et al.

(10) Patent No.: US 12,170,444 B2
(45) Date of Patent: *Dec. 17, 2024

(54) GRID POWER FOR HYDROCARBON SERVICE APPLICATIONS

(71) Applicant: Halliburton Energy Services, Inc., Houston, TX (US)

(72) Inventors: Glenn Howard Weightman, Duncan, OK (US); Carlos Alfredo Vallejo, Houston, TX (US); David Norman Todd, Houston, TX (US); Mohamad Alshutlawy, Houston, TX (US); John Harold Fischer, Hempstead, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/209,319

(22) Filed: Jun. 13, 2023

(65) Prior Publication Data
US 2023/0327441 A1   Oct. 12, 2023

Related U.S. Application Data

(63) Continuation of application No. 17/393,174, filed on Aug. 3, 2021, now Pat. No. 11,715,951, which is a continuation of application No. 16/553,006, filed on Aug. 27, 2019, now Pat. No. 11,108,234.

(51) Int. Cl.
*H02J 3/00* (2006.01)
*H02J 3/02* (2006.01)

(52) U.S. Cl.
CPC .......... *H02J 3/0075* (2020.01); *H02J 3/0073* (2020.01); *H02J 3/02* (2013.01); *H02J 3/003* (2020.01)

(58) Field of Classification Search
CPC ...................................... H02J 3/003
See application file for complete search history.

(56) References Cited

U.S. PATENT DOCUMENTS

| 1,743,771 A | 3/1926 | Hall |
| 2,244,106 A | 5/1938 | Granberg et al. |
| 3,130,353 A | 4/1964 | Mount, Jr. |

(Continued)

FOREIGN PATENT DOCUMENTS

| CN | 106536031 A | * | 3/2017 | ............ B01F 13/004 |
| EP | 1220410 A2 | * | 7/2002 | ............... H02H 3/20 |

(Continued)

*Primary Examiner* — Suresh Suryawanshi
(74) *Attorney, Agent, or Firm* — Conley Rose, P.C.; Rodney B. Carroll

(57) ABSTRACT

A method for calibrating a unit controller with a managing process determining a position of a decoupler mechanism on the pumping unit. The managing process can calibrate the unit controller with a dual pump mode in response to determining the decoupler mechanism is in a coupled position. The managing process can calibrate the unit controller with a single pump mode in response to determining the decoupler mechanism is in a decoupled position with the pumping unit operating with the first fluid end coupled to the power end and the second fluid end decoupled from the power end. The system controller can pump a wellbore treatment fluid in accordance with the pumping unit in i) the dual pump mode or ii) the single pump mode.

21 Claims, 9 Drawing Sheets

(56) References Cited

U.S. PATENT DOCUMENTS

| | | | |
|---|---|---|---|
| 5,077,628 A * | 12/1991 | Neuhouser | H02H 7/222 361/90 |
| 7,309,835 B2 | 12/2007 | Morrison et al. | |
| 7,940,039 B2 | 5/2011 | de Buda | |
| 8,789,601 B2 | 7/2014 | Broussard et al. | |
| 8,834,012 B2 | 8/2014 | Case et al. | |
| 8,997,904 B2 | 4/2015 | Cryer et al. | |
| 9,103,193 B2 | 8/2015 | Coli et al. | |
| 9,140,110 B2 | 9/2015 | Coli et al. | |
| 9,366,114 B2 | 6/2016 | Coli et al. | |
| 9,395,049 B2 | 7/2016 | Vicknair et al. | |
| 9,410,410 B2 | 8/2016 | Broussard et al. | |
| 9,475,020 B2 | 10/2016 | Coli et al. | |
| 9,475,021 B2 | 10/2016 | Coli et al. | |
| 9,534,473 B2 | 1/2017 | Morris et al. | |
| 9,562,420 B2 | 2/2017 | Morris et al. | |
| 9,611,728 B2 | 4/2017 | Oehring | |
| 9,650,871 B2 | 5/2017 | Oehring et al. | |
| 9,893,500 B2 | 2/2018 | Oehring et al. | |
| 9,966,206 B1 | 5/2018 | Sastry et al. | |
| 9,970,278 B2 | 5/2018 | Broussard et al. | |
| 10,008,880 B2 | 6/2018 | Vicknair et al. | |
| 10,020,711 B2 | 7/2018 | Oehring et al. | |
| 10,107,084 B2 | 10/2018 | Coli et al. | |
| 10,107,085 B2 | 10/2018 | Coli et al. | |
| 10,221,668 B2 | 3/2019 | Coli et al. | |
| 10,246,984 B2 | 4/2019 | Payne et al. | |
| 10,227,855 B2 | 5/2019 | Coli et al. | |
| 10,526,882 B2 | 1/2020 | Oehring et al. | |
| 10,686,301 B2 | 1/2020 | Oehring et al. | |
| 10,648,311 B2 | 5/2020 | Oehring et al. | |
| 10,879,727 B1 | 12/2020 | Cooper | |
| 11,108,234 B2 | 8/2021 | Weightman et al. | |
| 11,208,878 B2 | 12/2021 | Oehring et al. | |
| 11,449,018 B2 | 9/2022 | Oehring et al. | |
| 11,715,951 B2 | 8/2023 | Weightman et al. | |
| 2003/0057704 A1 | 3/2003 | Baten et al. | |
| 2009/0068031 A1 | 3/2009 | Gambier et al. | |
| 2009/0095482 A1 | 4/2009 | Surjaatmadja | |
| 2009/0200290 A1 | 8/2009 | Cardinal et al. | |
| 2010/0038907 A1 | 2/2010 | Hunt et al. | |
| 2011/0241590 A1 | 10/2011 | Horikoshi et al. | |
| 2012/0112757 A1 | 5/2012 | Vrankovic et al. | |
| 2012/0255734 A1 | 10/2012 | Coli et al. | |
| 2013/0306322 A1 | 11/2013 | Sanborn et al. | |
| 2014/0077607 A1 | 3/2014 | Clarke et al. | |
| 2014/0111896 A1 | 4/2014 | Liptak et al. | |
| 2014/0138079 A1 | 5/2014 | Broussard et al. | |
| 2014/0174717 A1 | 6/2014 | Broussard et al. | |
| 2014/0294603 A1 | 10/2014 | Best | |
| 2015/0114652 A1 | 4/2015 | Lestz et al. | |
| 2015/0252661 A1 | 9/2015 | Glass | |
| 2016/0105022 A1 | 4/2016 | Oehring et al. | |
| 2016/0290114 A1 | 10/2016 | Oehring et al. | |
| 2016/0326854 A1 | 11/2016 | Broussard et al. | |
| 2016/0326855 A1 | 11/2016 | Coli et al. | |
| 2016/0348479 A1 | 12/2016 | Oehring et al. | |
| 2016/0369609 A1 | 12/2016 | Morris et al. | |
| 2017/0016433 A1 | 1/2017 | Chong et al. | |
| 2017/0028368 A1 | 2/2017 | Oehring et al. | |
| 2017/0030177 A1 | 2/2017 | Oehring et al. | |
| 2017/0104389 A1 | 4/2017 | Morris et al. | |
| 2017/0125984 A1 * | 5/2017 | Mergener | H02J 13/00022 |
| 2017/0145918 A1 | 5/2017 | Oehring et al. | |
| 2017/0226839 A1 | 8/2017 | Broussard et al. | |
| 2017/0314380 A1 | 11/2017 | Oehring et al. | |
| 2018/0138740 A1 | 5/2018 | Churnock et al. | |
| 2018/0156210 A1 | 6/2018 | Oehring et al. | |
| 2018/0183219 A1 | 6/2018 | Oehring et al. | |
| 2018/0258746 A1 | 9/2018 | Broussard et al. | |
| 2018/0278124 A1 | 9/2018 | Oehring et al. | |
| 2018/0334893 A1 | 11/2018 | Oehring | |
| 2018/0363434 A1 | 12/2018 | Coli et al. | |
| 2018/0363435 A1 | 12/2018 | Coli et al. | |
| 2018/0363436 A1 | 12/2018 | Coli et al. | |
| 2018/0363437 A1 | 12/2018 | Coli et al. | |
| 2018/0363438 A1 | 12/2018 | Coli et al. | |
| 2019/0003329 A1 | 1/2019 | Morris et al. | |
| 2019/0010793 A1 | 1/2019 | Hinderliter | |
| 2019/0049909 A1 * | 2/2019 | Krippner | E21B 41/00 |
| 2019/0055827 A1 | 2/2019 | Coli et al. | |
| 2019/0245348 A1 | 8/2019 | Hinderliter et al. | |
| 2019/0258212 A1 | 8/2019 | Morton et al. | |
| 2020/0300073 A1 | 9/2020 | Hinderliter et al. | |
| 2021/0032961 A1 | 2/2021 | Hinderliter et al. | |
| 2021/0131248 A1 | 5/2021 | Hinderliter et al. | |
| 2022/0200262 A1 | 6/2022 | Johansson | |

FOREIGN PATENT DOCUMENTS

| | | |
|---|---|---|
| KR | 100267866 B1 * | 10/2001 |
| WO | 2014177346 A1 | 11/2014 |

* cited by examiner

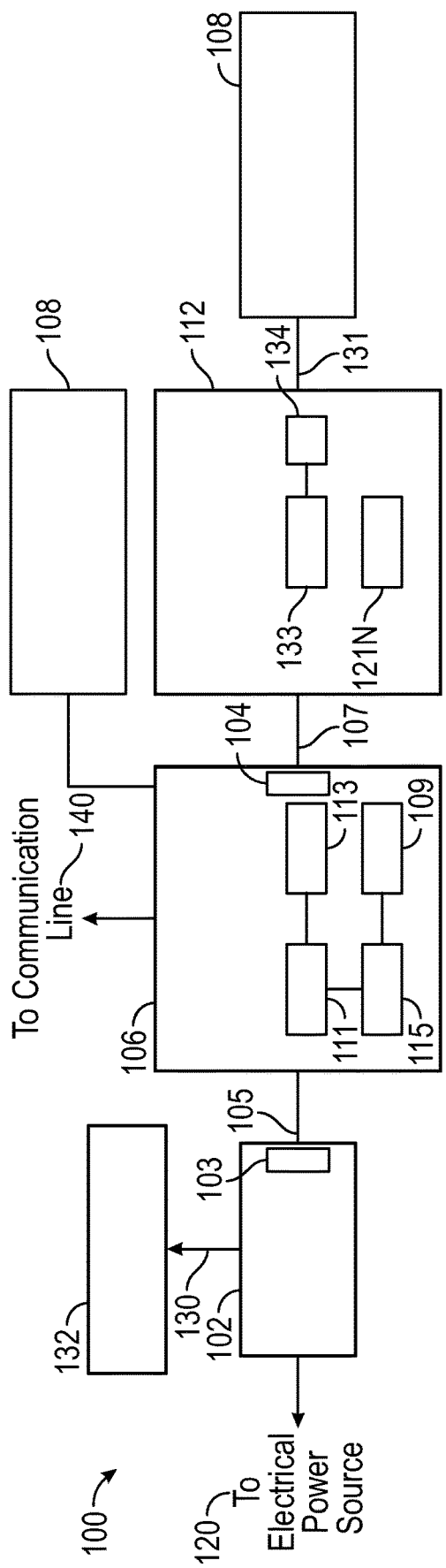
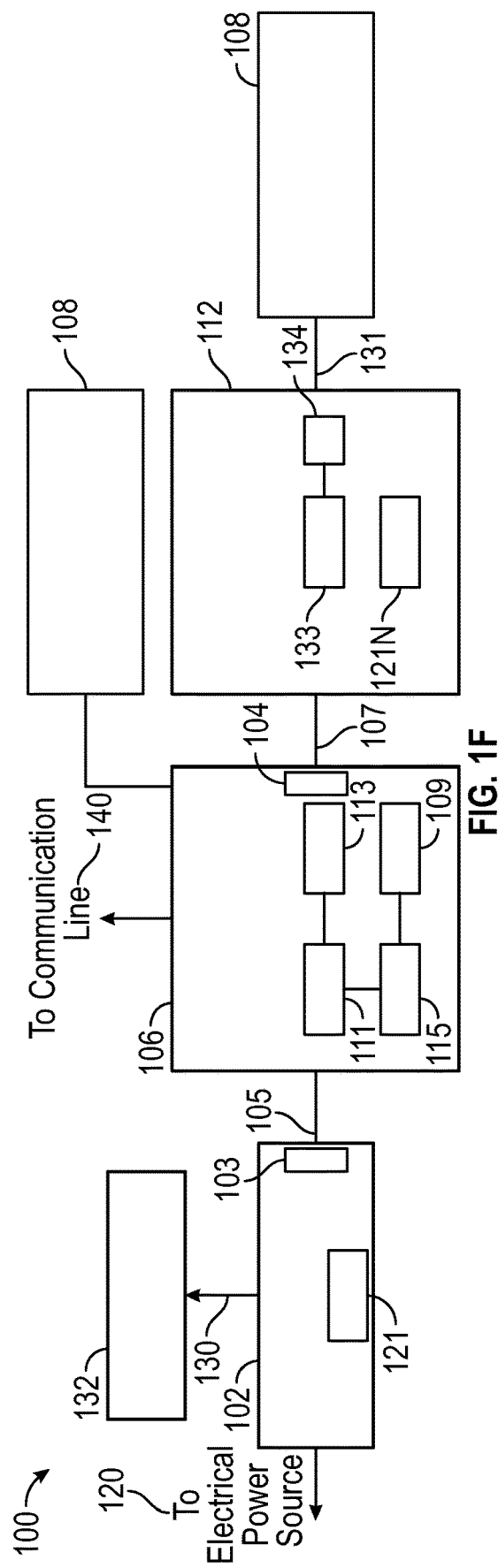
FIG. 1E
FIG. 1F

GRID POWER FOR HYDROCARBON SERVICE APPLICATIONS

CROSS-REFERENCE TO RELATED APPLICATIONS

The present application is a continuation of and claims priority to U.S. patent application Ser. No. 17/393,174 filed Aug. 3, 2021, and published as U.S. Patent Application Publication No. 2021/0376608 A1, which is a continuation of and claims priority to U.S. patent application Ser. No. 16/553,006 filed Aug. 27, 2019, now U.S. Pat. No. 11,108,234 B2, each entitled "Grid Power for Hydrocarbon Service Applications," each of which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure relates generally to providing grid power for one or more operations at a site and, more particularly, to providing grid power to a hydrocarbon service application at a site.

BACKGROUND

In general, pre-production or upstream hydrocarbon services operations at a site utilize diesel-powered equipment, natural gas or both as the power source for the site. For example, an electric stimulation operation may utilize generators, such as turbines, that have as a fuel source natural gas or diesel. Such generators require that the fuel source be transported and stored at the site. However, each of these fuel sources has an associated emission that at many sites may not be conducive to the operating constraints imposed for the site. Emission standards at some locations or sites are becoming more stringent such that current equipment is not conducive for meeting these more stringent emission standards. A need exists for an improved power source that provides the required power necessary for the equipment at a site while meeting emission standards.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIGS. 1A, 1B, 1C, 1D, 1E, 1F, 1G, 1H and 1I are diagrams illustrating an example grid power system, according to one or more aspects of the present disclosure.

DETAILED DESCRIPTION

Figure 1A:
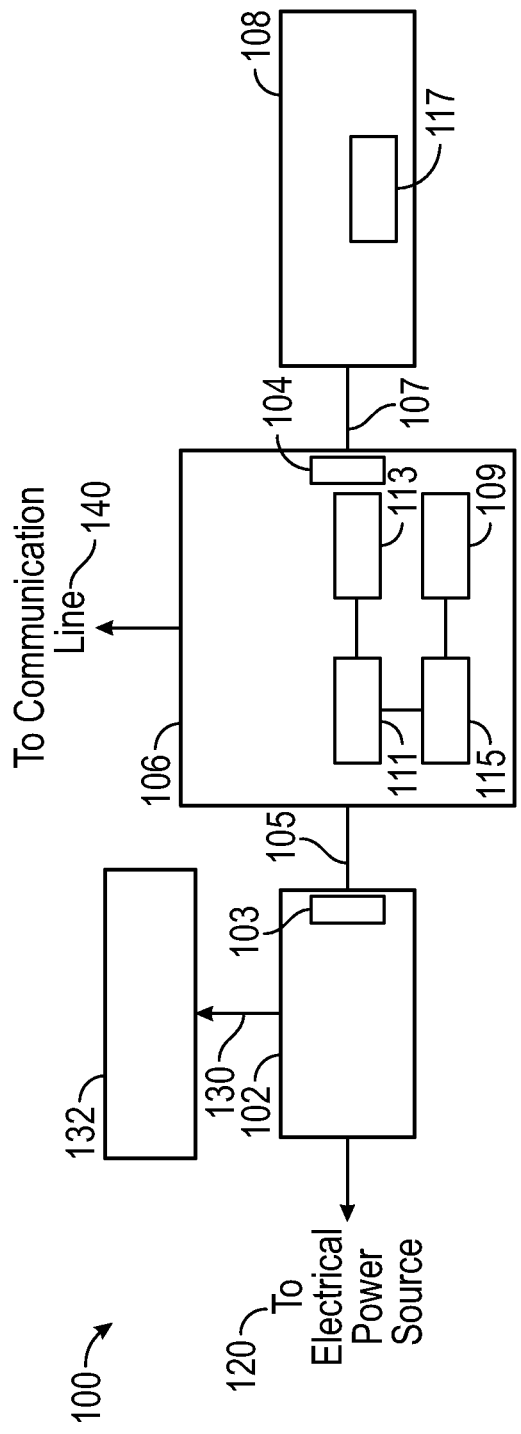

The present disclosure relates generally to providing grid power at a site and, more particularly, to providing grid power of hydrocarbon services at a site.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. For example, a widget "1A" refers to an instance of a widget class, which may be referred to collectively as widgets "1" and any one of which may be referred to generically as widget "1". In the figures and the description, like numerals are intended to represent like elements. A numeral followed by the alphabetical characters "N" refers to any number of widgets.

To facilitate a better understanding of the present disclosure, the following examples of certain embodiments are given. In no way should the following examples be read to limit, or define, the scope of the disclosure. Embodiments of the present disclosure may be applicable to drilling operations that include but are not limited to target (such as an adjacent well) following, target intersecting, target locating, well twinning such as in SAGD (steam assist gravity drainage) well structures, drilling relief wells for blowout wells, river crossings, construction tunneling, as well as horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Embodiments described below with respect to one implementation are not intended to be limiting.

Many job sites or operations require a power source that is capable of providing power for an extensive area, to various equipment, at various voltage/current ratings, etc. all while meeting certain or specified emission standards. To meet these emission standards, a power source is needed that provides the power required by the various equipment at a site for the various operations, for example, hydrocarbon services, without any or with very low emissions. A grid power source offers the opportunity supply large quantities of power to a site, even a remote site, without the burdens (such as costs of storage and transportation, personnel and safety) associated with typical fuel-based power sources. The present disclosure provides a grid power system that is used as a power source or a power grid, to distribute power (for example, switchgear) and to transform power from one voltage to another. For example, the one or more grid power components are configured to and are capable of supporting one or more hydrocarbon or well service operations such as hydraulic fracturing operations and delivery of clean fluid, slurry or proppant. The grid power source may support the providing of power to one or more sites. For example, the grid power source provides a utility grid power that can supply large quantities of hydraulic power to large hydraulic fracturing treatments for the simultaneous fracturing at multiple well sites.

Using the grid power system as the power source to supply the required or necessary power to one or more well sites has several benefits over equipment that requires fuel-based power. For example, the costs associated with a hydrocarbon service may be reduced as the transportation and storage of fuel, additional personnel to manage and handle the storage and maintenance and transportation of the fuel are not required, less equipment is required, less maintenance of equipment is required as electric powered equipment is generally more reliable and fewer personnel are required at the site. For example, a typical generator with assorted support and connectivity equipment at a hydrocarbon services site requires a large footprint and requires that large amounts of fuel be available to maintain operations without interruption or down-time. The grid power system is compact and requires less space, equipment and personnel than the corresponding fuel-based power sources. Such also reduces safety risks due to the decrease in equipment at the sight and exposure to fuel through delivery, storage, maintenance and distribution at the site of the fuel. Also, emissions at a site associated with the power source are reduced or eliminated when the power source is electrical as opposed to fuel-based. Additionally, noise associated with the operation of equipment at the site may be reduced as electric powered service equipment operates at a quieter level as compared to fuel-based equipment. The grid power system also requires a smaller footprint as compared to the fuel-based power sources. Thus, the grid power source provides inexpensive, safe and reliable power to a site, such as a hydrocarbon services site.

In one or more embodiments of the present disclosure, an environment may utilize an information handling system to control, manage or otherwise operate one or more operations, devices, components, networks, any other type of system or any combination thereof. For purposes of this disclosure, an information handling system may include any instrumentality or aggregate of instrumentalities that are configured to or are operable to compute, classify, process, transmit, receive, retrieve, originate, switch, store, display, manifest, detect, record, reproduce, handle, or utilize any form of information, intelligence, or data for any purpose, for example, for a maritime vessel or operation. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data, instructions or both for a period of time. Computer-readable media may include, for example, without limitation, storage media such as a sequential access storage device (for example, a tape drive), direct access storage device (for example, a hard disk drive or floppy disk drive), compact disk (CD), CD read-only memory (ROM) or CD-ROM, DVD, RAM, ROM, electrically erasable programmable read-only memory (EEPROM), and/or flash memory, biological memory, molecular or deoxyribonucleic acid (DNA) memory as well as communications media such wires, optical fibers, microwaves, radio waves, and other electromagnetic and/or optical carriers; and/or any combination of the foregoing.

FIGS. 1A-1I are diagrams illustrating an example grid power system 100. A site, such as a hydrocarbon services environment, may require the distribution of power to various equipment distributed at or about the site, for example, as illustrated in FIGS. 1A-1I, 2 and 3. While FIGS. 1A-1I, 2 and 3 illustrate a power system for use at a wellsite, the present disclosure contemplates the power grid system may be appropriate for any site that requires distribution of power to equipment distributed at or about the site.

Typical voltages ranges for power supplied by a grid is at or about 12.47 kiloVolts (kV) to at or about 34.4 kV. As discussed in the present disclosure, a grid power system 100 may provide the required voltage range necessary to provide power to a variety of equipment at a site. The present disclosure provides configurations of a grid power system for the efficient and safe distribution of power at a site.

As illustrated in FIG. 1A, a main breaker 102 may be coupled to an electrical power source, for example, an electrical power source 120, for example, a utility power grid. The main breaker 102 may be operated or controlled remotely. For example, one or more operations of the main breaker 102 may be remotely operated or controlled through a communication line 130. Main breaker 102 may be coupled directly, indirectly, wired or wirelessly via communication line 130 to a control center, a controller or a centralized command center 132 that comprises an information handling system, for example, information handling system 500 of FIG. 5. The control center 132 may control one or more operations of the main breaker 102. The one or more operations of the main breaker 102 that may be controlled remotely or otherwise by the control center 132 comprise an open operation, a close operation or both of the main breaker 102, a monitor status operation (for example, state of the main breaker as opened or closed), and a monitoring one or more operating parameters (including, but not limited to, voltage, current, harmonics, and power available). In one or more embodiments, the main breaker 102 may be enclosed in a housing. The main breaker 102 may be a mobile unit so as to allow for transport between one or more sites. The main breaker 102 provides electrical power to one or more components or equipment at the site via one or more output lines 105. In one or more embodiments, main breaker 102 provides electrical power at the one or more output lines 105 at the utility line voltage of the electrical power source 120.

Figure 1B:
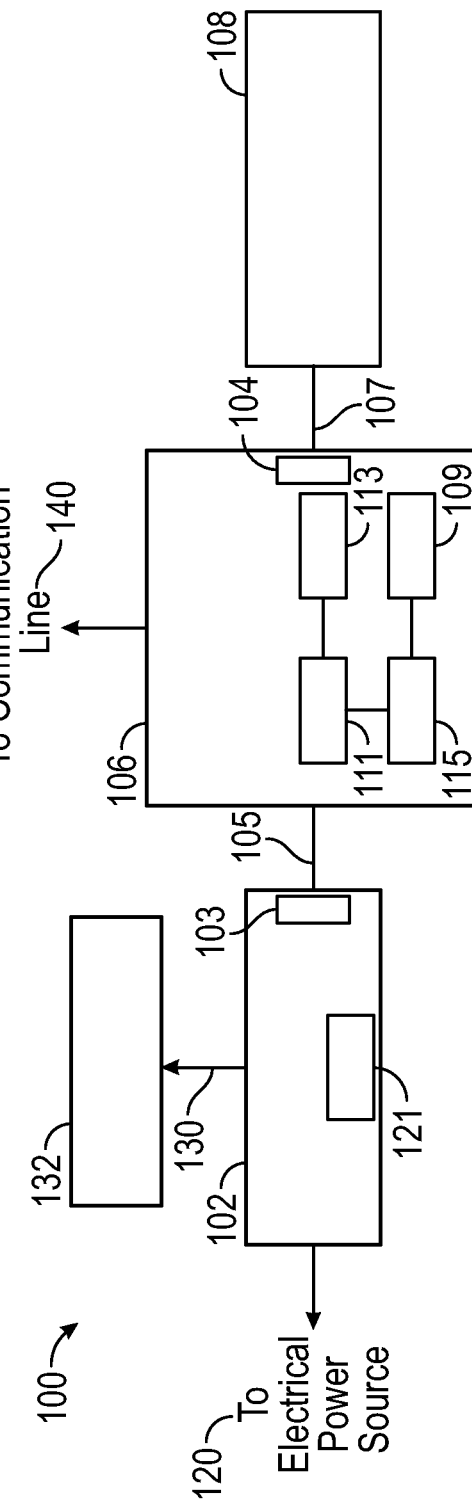

The main breaker 102 may comprise a current monitoring system 103. Current monitoring system 103 may comprise a current monitoring device (for example, a current transformer) and a control relay. In one or more embodiments, the current monitoring system 103 may monitor one or more output lines 105 and the main breaker 102 may be opened if a current at one or more output lines 105 reach, exceed or both a preset current limit or threshold. In one or more embodiments, the one or more output lines 105 may be coupled to one or more switchgear units 106. As illustrated in FIG. 1B, in one or more embodiments one or more switchgears 121 may be enclosed within the main breaker 102. In one or more embodiments, the main breaker 102 may comprise the one or more switchgear units 106. Any one or more of the main breaker 102 and the one or more switchgears 121 may be mobile units, for example, mounted or otherwise disposed on or about a transportation device to allow for ease of moving or reconfiguration at or about a site or to one or more other sites. A transportation device may comprise a skid, trailer, pallet, railcar, any other mobile or portable structure or any combination thereof.

The one or more switchgear units 106 protect one or more power distribution lines 107 that are coupled to one or more loads 108 such that the one or more loads 108 are not damaged due to power fluctuations or other harmful conditions. For example, the one or more switchgear units 106 may comprise a load control device 104, such as one or more breakers, one or more fused disconnects, one or more other load control devices or any combination thereof, to protect the one or more power distribution lines 107. In one or more embodiments, the one or more switchgear units 106 comprise a load control device 104 associated with each power distribution line 107 coupled to one or more loads 108. The one or more loads 108 may comprise one or more pumping units, for example, one or more electric pumping units (EPU), one or more electric blending units, one or more water supply systems, one or more sand or proppant handling systems, one or more wireline units, one or more command centers, one or more crew houses, any lighting associated with the hydrocarbon services environment, one or more coiled tubing units, any other equipment that requires electrical power at a line voltage at the site and any combination thereof. The one or more loads may comprise one or more transformers 117 to reduce line voltage to a level required by the load 108. For example, a transformer of an EPU may reduce line voltage to a level required by a variable frequency drive and the transformer may have multiple secondary outputs where the outputs are shifted in phase to one another so that the multiple secondary outputs distribute load current pulses in time with the benefit of reducing harmonic distortion as seen by the electrical power source 120, for example, a utility power grid.

In one or more embodiments, the one or more switchgear units 106 may comprise a heating, ventilation and air conditioning (HVAC) system 109. The HVAC system 109 controls the temperature of the switchgear unit 106. The switchgear unit 106 may comprise an uninterruptable power supply (UPS) 111 for providing power to a computing system 113 where the computing system 113 comprises a computer, a user interface, a network interface, any other computer or network component or any combination thereof, for example, an information handling system 500 of FIG. 5. The one or more switchgear units 106 may comprise a transformer 115 to reduce line voltage to a level required for low voltage equipment within the one or more switchgear units 106. For example, the transformer 115 may be coupled to the HVAC system 109, the UPS 111 or both to provide the required power. In one or more embodiments, the one or more switchgear units 106 may be coupled to a communication line 140. The one or more switchgear units 106 may be coupled directly, indirectly, wired or wirelessly via communication line 140 to an information handling system, for example, information handling system 500 of FIG. 5, to a control center 132 or any other controller. For example, the one or more switchgear units may communicate via a communication line 140 to the information handling system 500 one or more power parameters associated with the switchgear unit 106. The one or more parameters may be indicative of an amount of power available to one or more loads 108 coupled to the switchgear unit 106.

Figure 1C:
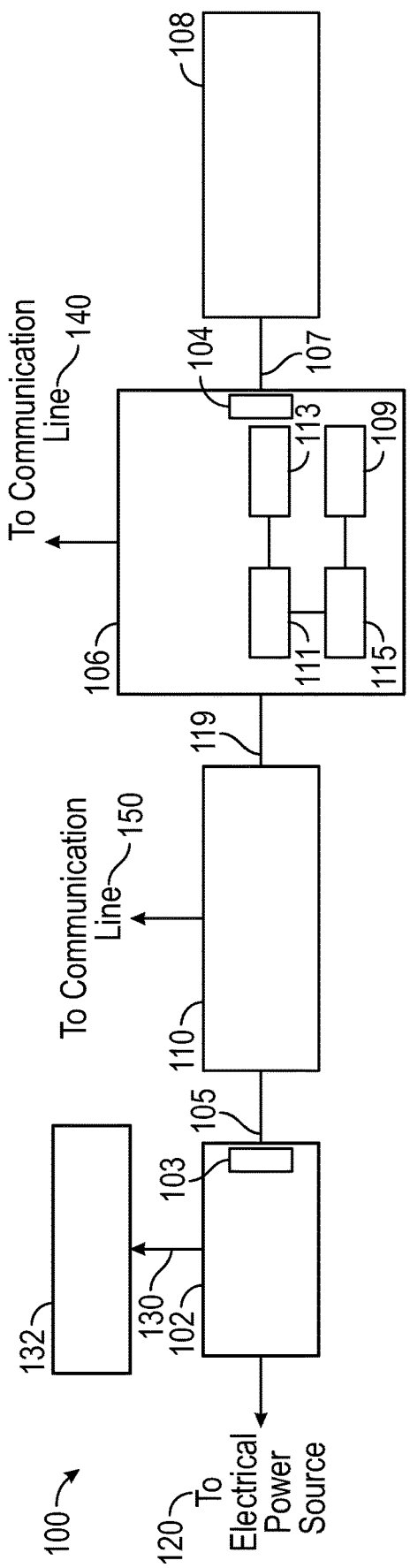

As illustrated in FIG. 1C, a main power distribution unit 110 may be disposed between the main breaker 102 and the one or more switchgear units 106. In one or more embodiments, the one or more switchgear units 106 may be enclosed within the main power distribution unit 110; the main distribution unit 110 may comprise the one or more switchgear units 106. With reference to FIG. 1C, the main breaker 102 may be coupled to the main distribution unit 110 via one or more output lines 105. The main power distribution unit 110 may be coupled to the one or more switchgear units 106 via one or more main power distribution lines 119. In one or more embodiments, the main power distribution unit 110 alone or comprising the one or more switchgear units 106 may be mobile or mounted or disposed on or about a transportation device. In one or more embodiments, the main power distribution unit 110 may be controlled or operated remotely using a communication line 150. Main power distribution unit 110 may be coupled directly, indirectly, wired or wirelessly via communication line 140 to an information handling system, for example, information handling system 500 of FIG. 5. In one or more embodiments, communication line 150, communication line 140 and communication line 130 may be the same communication line. The one or more operations of the main power distribution unit 110 that may be controlled remotely or otherwise may comprise an open breaker operation, a close breaker operation or both of the main power distribution unit 110, a monitor status operation (for example, state of a breaker as opened or closed), and a monitoring one or more operating parameters (for example, voltage, current, harmonics, and power available). The main power distribution unit 110 distributes power between the main breaker 102 and one or more switchgear units 106. For example, in one or more embodiments, such as FIG. 2, power may be supplied from a single feeder or source and the main power distribution unit 110 distributes the power received from the single source to multiple systems or devices at the site. In one or more embodiments, the main breaker 102 may be enclosed in a housing.

Figure 1D:
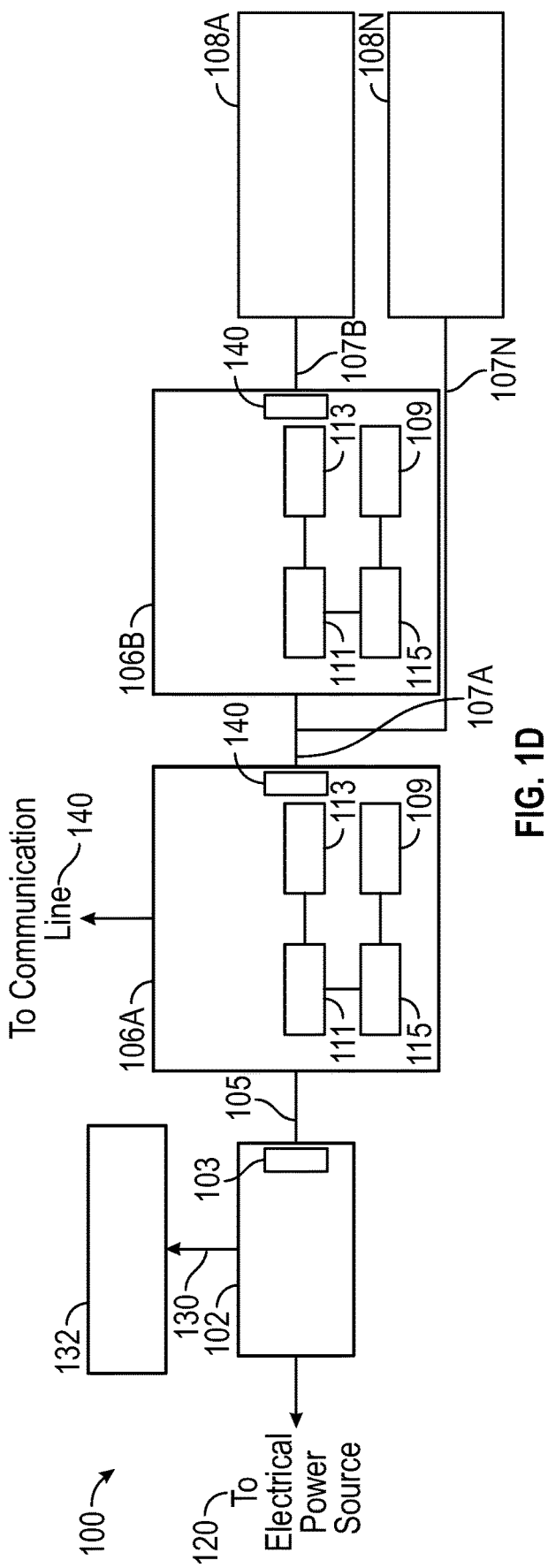

In one or more embodiments as illustrated in FIG. 1D, a main breaker 102 may be coupled to a first switchgear unit 106 (switchgear unit 106A). The switchgear unit 106A may be coupled to one or more second switchgear units 106 (switchgear unit 106B) via one or more power distribution lines 107A and one or more loads 108N via one or more power distribution lines 107N. Coupling the main breaker 102 to the switchgear unit 106A increases the number of breakers and drops available to the grid power system 100. Switchgear unit 106B may be coupled to one or more loads 108A via one or more power distribution lines 107B. In one or more embodiments, the interconnection between switchgear unit 106A and switchgear unit 106B is through a circuit breaker. In one or more embodiments, the power delivered to the first switchgear unit 106A may be as discussed above with respect to FIG. 1A, 1B, or 1C.

As illustrated in FIGS. 1E-1I, a grid power unit 112 may also be utilized as part of the grid power system 100. FIG. 1E is similar to FIG. 1A except that the one or more switchgear units 106 are coupled to one or more grid power units 112 via one or more power distribution lines 107. In one or more embodiments, the one or more grid power units 112 receive a line voltage via the one or more power distribution lines 107. In one or more embodiments, one or more grid power units 112 as discussed with respect to FIG. 1E may be disposed between the switchgear unit 106A and the switchgear unit 106B and the one or more loads 108N, between the switchgear unit 106B and one or more loads 108A or both. Similar to FIG. 1A, the one or more switchgear units 106 of FIG. 1E may also be coupled to one or more loads 108 via one or more power distribution lines 107 and may be disposed on or about a transportation device. The one or more switchgear units 106 supply power to one or more grid power units 112. The one or more grid power units 112 may comprise one or more switchgears 121N, one or more transformers 133 (for example a medium voltage transformer) or both. The one or more grid power units 112 receive line voltage from the one or more switchgear units 105 via the one or more power distribution lines 107. The one or more grid power units 112 transform the received line voltage to a lower voltage and distribute the lower voltage to one or more transformers 133 and one or more switchgears 121N. The one or more transformers 133 may supply power at one or more different voltage levels, for example, one or more voltage levels below the line voltage level. The one or more loads 108 may be coupled to the one or more grid power units 112 and may receive the lower voltage from the one or more grid power units 112 via the one or more grid power lines 131.

The one or more transformers 133 may comprise a single secondary winding or a plurality secondary windings that are shifted in phase from one another. The one or more transformers 133 may reduce harmonic distortion expressed to the electrical power source 120. In one or more embodiments, at least one of the transformers 133 may comprise a delta-wye transformer. The one or more transformers 133 may be coupled to a low-resistance ground (LRG) system or a high-resistance ground (HRG) system, for example, system 134. The wye connection of the secondary winding allows the benefit of using a system 134, for example, the LRG system or the HRG system which reduces single-phase fault current and improves personnel safety. The LRG system or HRG system 134 may include monitoring circuitry to determine the state of one or more components of the grid power system 100. The purpose of the LRG system or HRG system 134 is to limit the fault current and improve safety so as to have less voltage rise on any one or more components. By monitoring the ground current, the one or more grid power units 112 can not only limit the ground current but can also alter or change one or more alterations based, at least in part, on the ground current. For example, a fault condition may be indicated by ground current reaching or exceeding a threshold value. One or more actions may be taken as a result of the fault condition, such as to alter one or more operations of the one or more switchgear units 106. In one or more embodiments, when a fault condition occurs, the control system 132 may cause a breaker of a switchgear unit to be opened. For example, the control system 132 may transmit a command to alter or change one or more operations of the switchgear unit.

Figure 1G:
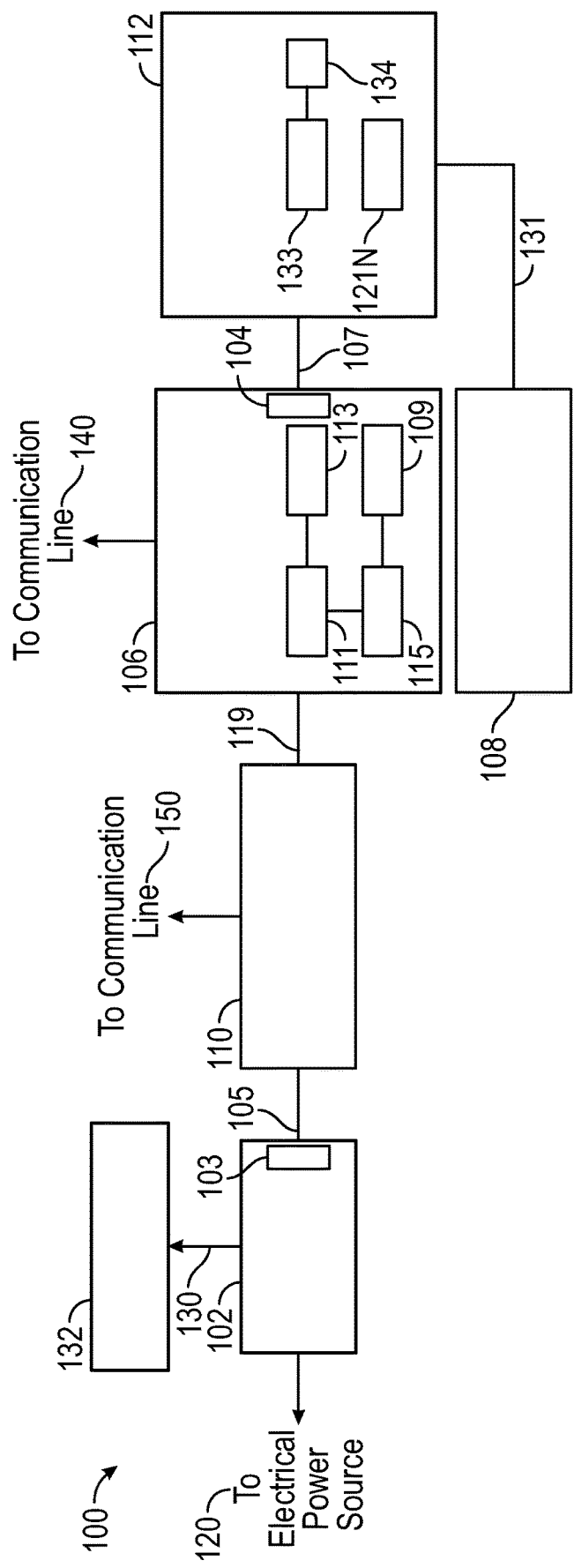
Figure 1H:
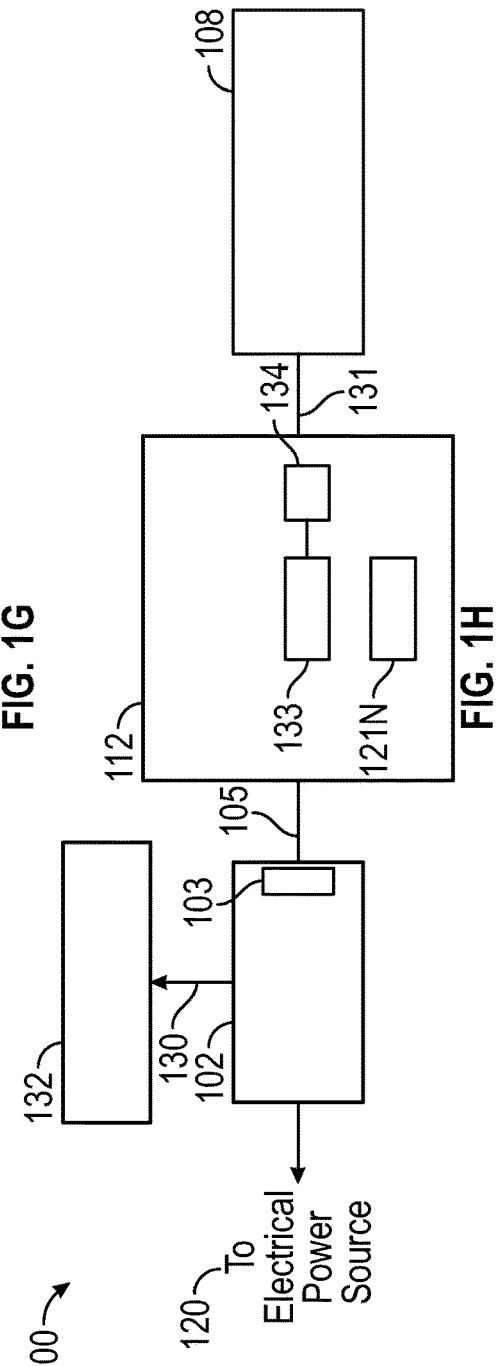

FIG. 1F is similar to FIG. 1B, except that one or more grid power units 112 may be disposed between the one or more switchgear units 106 and the one or more loads 108, as discussed with respect to FIG. 1E, such that the one or more switchgear units 106 couple to the one or more loads 108 through the one or more grid power units 112. FIG. 1G is similar to FIG. 1C, except that one or more grid power units 112 may be disposed between the one or more switchgear units 106 and the one or more loads 108 as discussed above with respect to FIG. 1E. FIG. 1H is similar to FIG. 1E, except that one or more grid power units 112 may be coupled to the main breaker 102 without an intermediate switchgear unit 106. In one or more embodiments, the power delivered to the one or more switchgear units 106 may be as discussed above with respect to FIG. 1E, 1F or 1G.

Figure 1I:
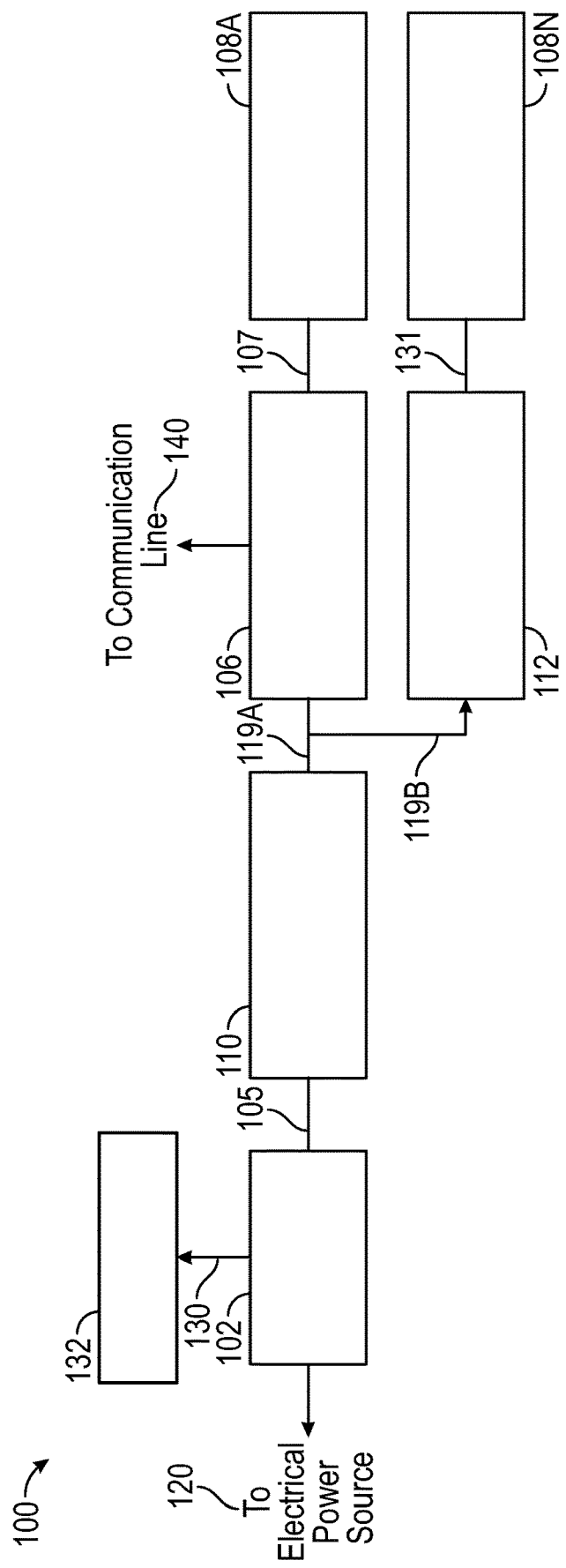

FIG. 1I is similar to FIG. 1G, except the one or more grid power units 112 are coupled to the main power distribution unit 112 via one or more main power distribution lines 119B and the one or more switchgear units 106 via one or more main power distribution lines 119A. The one or more switchgear units 106 and the one or more grid power units 112 are thus in parallel to each other. The one or more grid power units 112 may be coupled to one or more loads 108N via the one or more grid power lines 131 and the one or more switchgear units 106 are coupled to the one or more loads 108A via the one or more power distribution lines 107. In one or more embodiments, the power supplied to the one or more switchgear units 106 as discussed above with respect to FIGS. 1E, 1F and 1G.

In any one or more embodiments, the one or more output lines 105, distribution lines 107, main power distribution lines 119 and grid power lines 131 may comprise individual conductors, multiple conductors, insulated bus bars, multi-core cables, multi-core cables with ground checkback or any other features and any other type of conductors known to one of skill in the art, and any other type of coupling, line or cable as required by a particular operation or job site.

Figure 2:
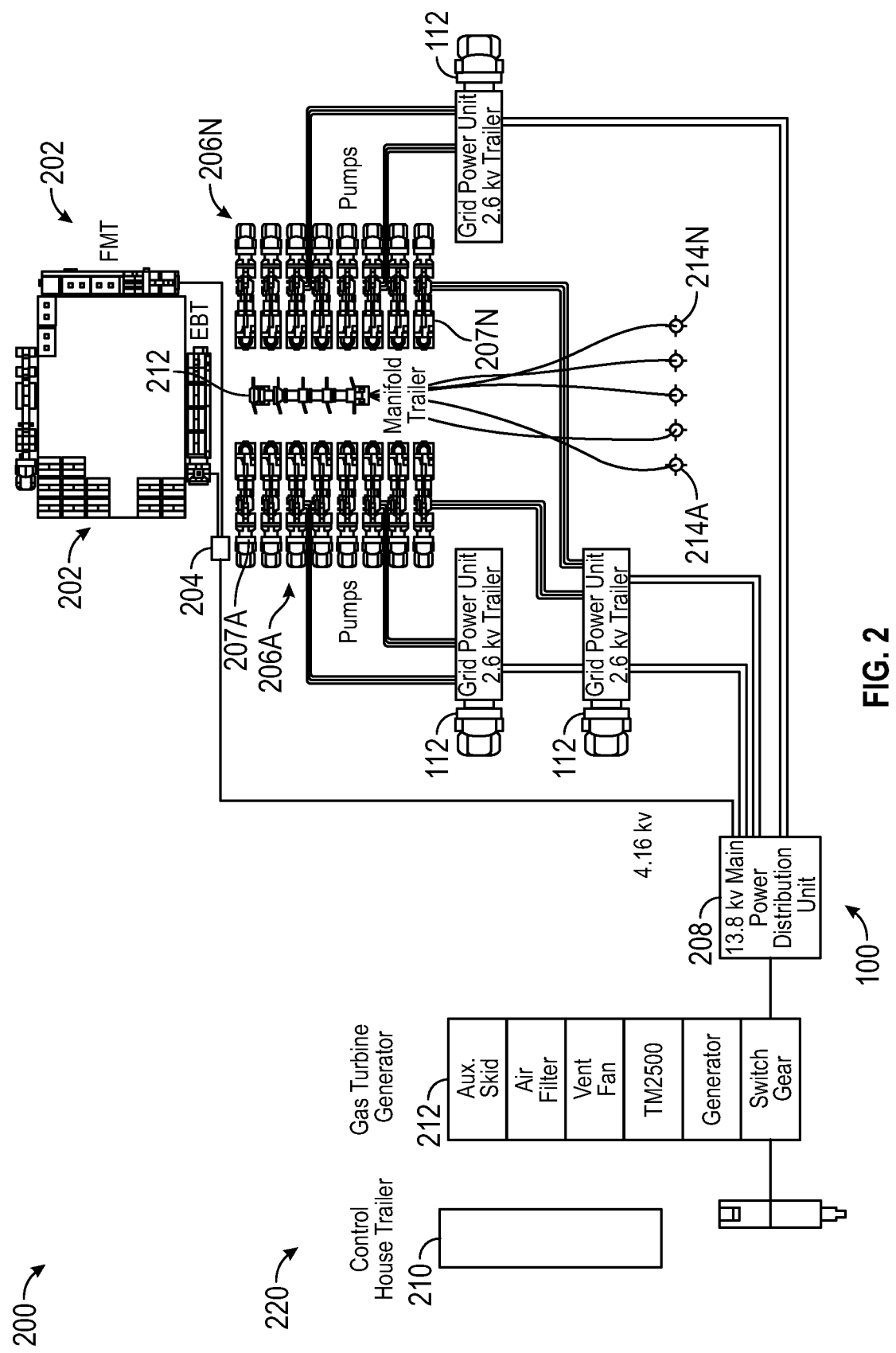
FIG. 2 is a diagram illustrating an example grid power system environment, according to one or more aspects of the present disclosure.

FIG. 2 is a diagram illustrating an example grid power system environment 200, according to one or more aspects of the present disclosure. The grid power system environment 200 may comprise any one or more of the grid power systems 100 as discussed with respect to FIGS. 1A-I, except that the electrical power source 120 is replaced with a mobile power generation system 220. A mobile power generation system 220 comprises a control unit, for example, house trailer 210, for controlling a gas turbine generator 212 and a power source, for example, turbine generator 212. A turbine generator 212, for example, a gas turbine generator, may be coupled to the grid power system 100. Grid power system 100 may be coupled to one or more components or equipment 220 at the grid power system environment 200. The one or more components may be required for one or more operations or services associated with the grid power system environment 200.

In one or more embodiments, the one or more components or equipment may comprise a blending system 202. The blending system 202 may be coupled to a blender power distribution unit 204. One or more pumping systems 206 may comprise one or more pumps 207, for example, a pumping system 206A may comprise one or more pumps 207A and pumping system 206N may comprise one or more pumps 207N. The blender power distribution unit 204 and one or more pumping systems 206 may be coupled to the grid power system 100 such that the grid power system 100 provides power to the blender power distribution unit 204 and one or more pumping systems 206. For example, grid power system 100 may comprise a main breaker 102 and a switchgear unit 106 as power component 208 (for example, as illustrated in FIG. 3B) and one or more grid power units 112. The power component 208 may be coupled to the blender distribution unit 204 and the one or more grid power units 112. The blender power distribution unit 204 distributes the received power to one or more components of the blending system 202.

The one or more pumping systems 206 may be coupled to a manifold 212 and manifold 212 may be coupled to one or more wellheads 214, for example one or more wellheads 214A-214N.

Figure 3:
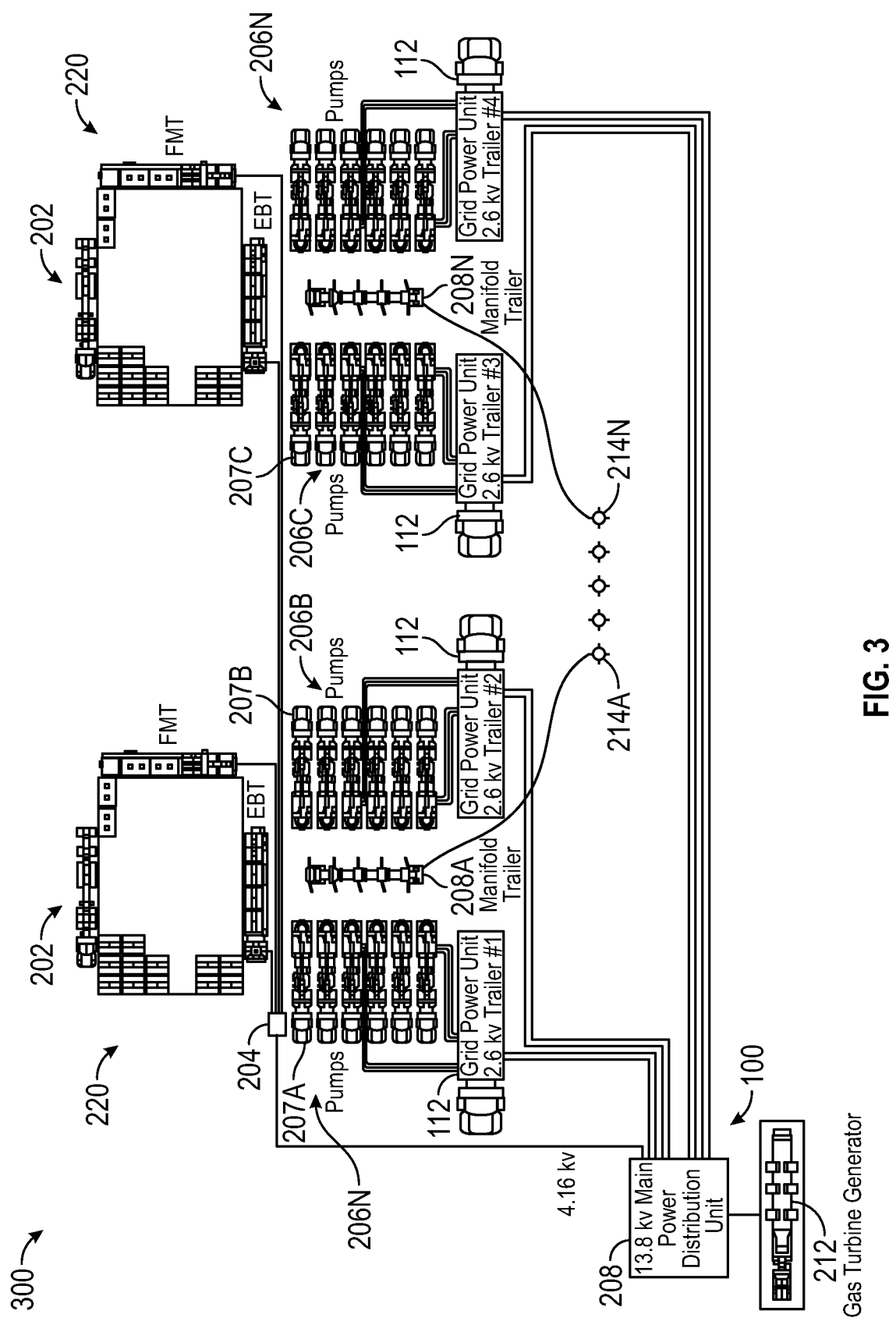
FIG. 3 is a diagram illustrating an example grid power system environment, according to one or more aspects of the present disclosure.

FIG. 3 is a diagram illustrating an example grid power system environment 300, according to one or more aspects of the present disclosure. FIG. 3 is similar to FIG. 2 except one or more components or equipment 220A are in parallel with one or more other components or equipment 220B. The configuration of FIG. 3, for example, may be used for treatment of a plurality of wells at the same time.

Figure 4:
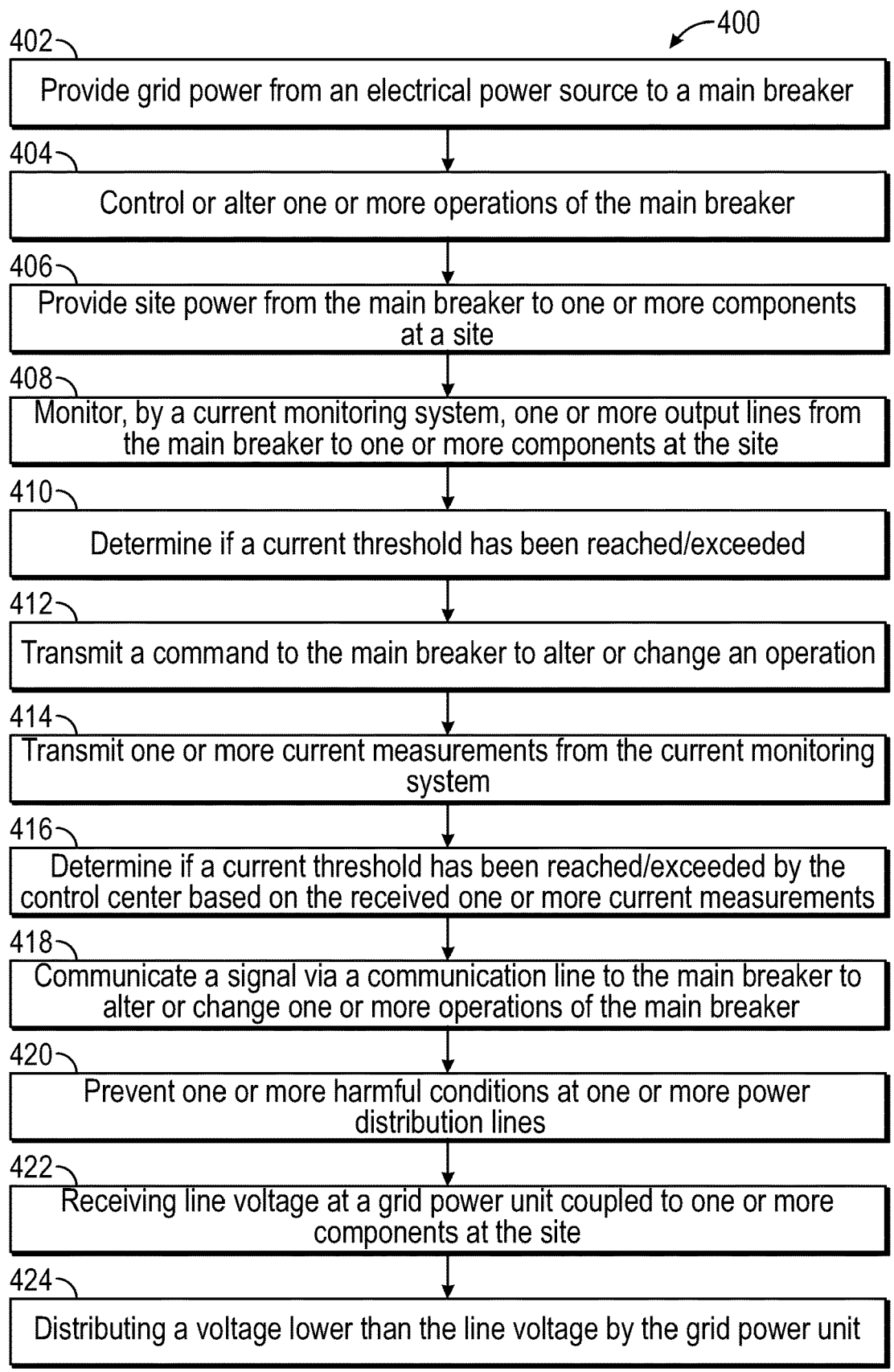
FIG. 4 is a flowchart illustrating an example method for providing grid power to an environment, for example, a hydrocarbon services environment, according to one or more aspects of the present disclosure.

FIG. 4 is a flowchart 400 illustrating an example method for providing a grid power to an environment, for example a well services environment, according to one or more aspects of the present disclosure. At step 402, grid power is provided from an electrical power source 120 to a main breaker 102, for example, as illustrated in FIGS. 1A-1I. As illustrated in FIGS. 2 and 3, the electrical power source may comprise a turbine generator 212, such as a gas turbine generator, a utility power grid, for example, a local utility provider or any other electrical power source capable of providing grid power.

At step 404, one or more operations of the main breaker 102 are controlled or altered by the control center 132. For example, in one or more embodiments, the main breaker may be monitored by the control center 132. For example, the control center 132 may received one or more operating parameters from the main breaker 102 including, but not limited to, voltage, current, harmonics and power available at the main breaker 102. The control center 132 may alter or control an operation of the main breaker 102 based, at least in part, on the received one or more operating parameters. For example, the control center 132 may send a command to the main breaker 102 to open the main breaker 102 based, at least in part, on the one or more operating parameters. In one or more embodiments, the control center 132 may log any of the one or more operating parameters received.

At step 406, site power is provided from the main breaker 102 to one or more components or equipment at a site, such as a well services environment, via one or more output lines 105, for example, as illustrated and discussed with respect to FIGS. 1A-1I. The power provided may be at a utility line voltage.

At step 408, a current monitoring system 103 of main breaker 102 may monitor one or more output lines 105 from the main breaker 102 to one or more components or equipment at the site. At step 410, it is determined if a current threshold, for example, has been reached, exceeded or both. At step 412, if the current threshold has been reached, exceeded or both, the current monitoring system 103 transmits a command to the main breaker 102 to alter or change an operation, for example, to cause the main breaker 102 to open. At step 414, in lieu of step 412 or in addition to step 412, in one or more embodiments, one or more current measurements from the current monitoring system 103 are transmitted via communication line 130 to a control center 132. For example, communication line 130 may comprise breaker status, breaker tripped, and any other status indication. At step 416, the control center 132 receives the one or more current measurements and determines if a current threshold has been reached, exceeded or both and if so, at step 418, the control center 132 communicates a signal via a communication line 130 to the main breaker 102 to alter or change one or more operations of the main breaker, for example, to open the main breaker 102.

At step 420, in one or more embodiments, one or more switchgear units 106 coupled to the main breaker 102, a main power distribution unit 110 coupled to the main breaker 102, or both may prevent one or more harmful conditions at the power distribution lines 107 that are coupled to one or more loads 108. At step 422, in one or more embodiments, as discussed with respect to FIGS. 1E-1I, line voltage may be received by a grid power unit 112. For example, a grid power unit may be coupled to one or more switchgear units 106, to main breaker 102, main power distribution unit 110 or any combination thereof. At step 424, a voltage lower than the line voltage is distributed by the grid power unit 112, for example, as discussed with respect to FIGS. 1E-1I.

In one or more embodiments, any one or more steps of FIG. 4 may not be implemented or may be implemented in any order.

Figure 5:
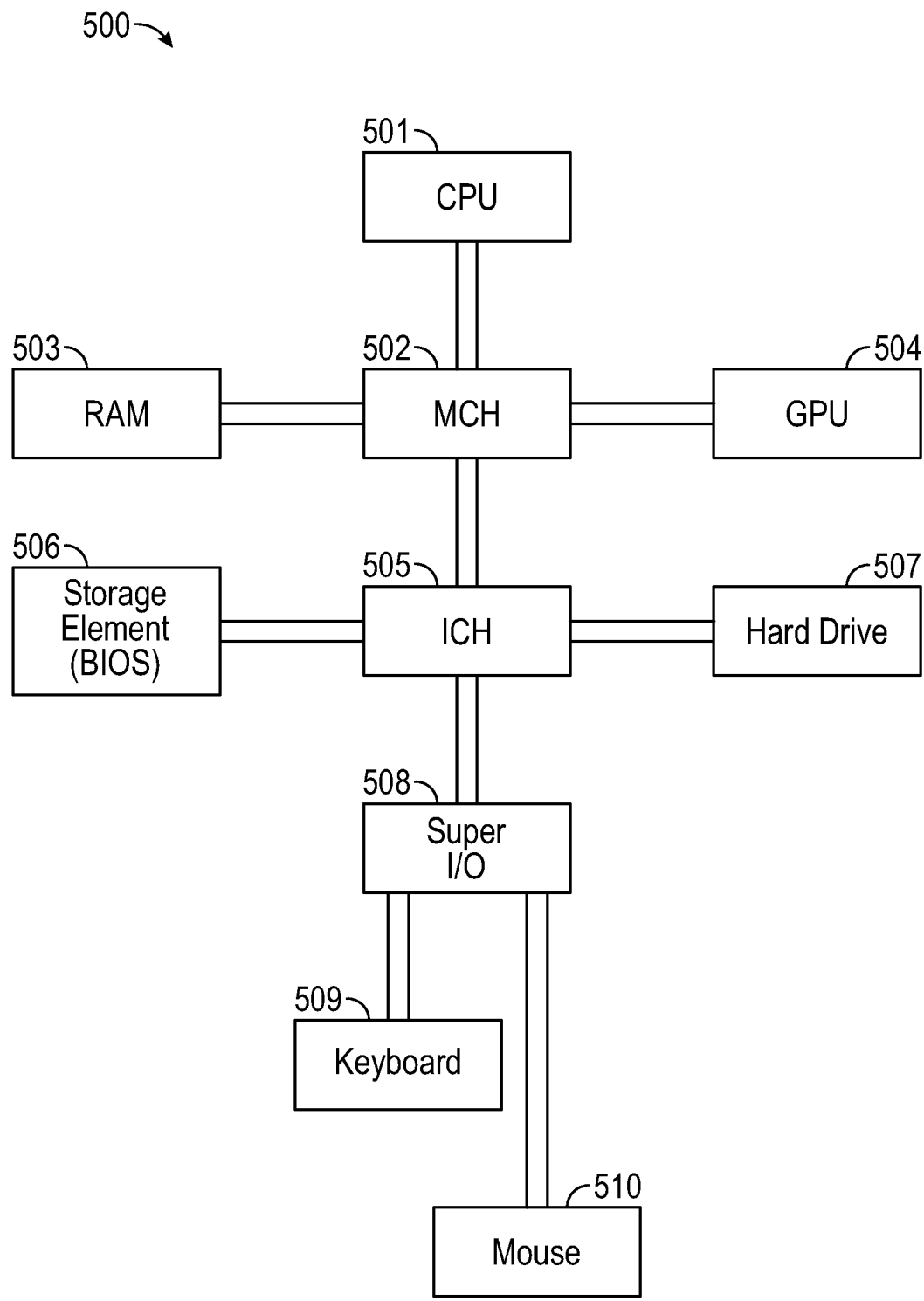
FIG. 5 is a diagram illustrating an information handling system, according to one or more aspects of the present disclosure.

FIG. 5 is a diagram illustrating an example information handling system 500, according to aspects of the present disclosure. A processor or central processing unit (CPU) 501 of the information handling system 500 is communicatively coupled to a memory controller hub or north bridge 502. The processor 501 may include, for example a microprocessor, microcontroller, digital signal processor (DSP), application specific integrated circuit (ASIC), or any other digital or analog circuitry configured to interpret and/or execute program instructions and/or process data. Processor 501 may be configured to interpret and/or execute program instructions or other data retrieved and stored in any memory such as memory 503 or hard drive 507. Program instructions or other data may constitute portions of a software or application for carrying out one or more methods described herein. Memory 503 may include read-only memory (ROM), random access memory (RAM), solid state memory, or disk-based memory. Each memory module may include any system, device or apparatus configured to retain program instructions and/or data for a period of time (for example, computer-readable non-transitory media). For example, instructions from a software program or an application may be retrieved and stored in memory 503 for execution by processor 501.

Modifications, additions, or omissions may be made to FIG. 5 without departing from the scope of the present disclosure. For example, FIG. 5 shows a particular configuration of components of information handling system 500. However, any suitable configurations of components may be used. For example, components of information handling system 500 may be implemented either as physical or logical components. Furthermore, in some embodiments, functionality associated with components of information handling system 500 may be implemented in special purpose circuits or components. In other embodiments, functionality associated with components of information handling system 500 may be implemented in configurable general purpose circuit or components. For example, components of information handling system 400 may be implemented by configured computer program instructions.

Memory controller hub (MCH) 502 may include a memory controller for directing information to or from various system memory components within the information handling system 500, such as memory 503, storage element 506, and hard drive 507. The memory controller hub 502 may be coupled to memory 503 and a graphics processing unit 504. Memory controller hub 502 may also be coupled to an I/O controller hub (ICH) or south bridge 505. I/O hub 505 is coupled to storage elements of the information handling system 500, including a storage element 506, which may comprise a flash ROM that includes a basic input/output system (BIOS) of the computer system. I/O hub 505 is also coupled to the hard drive 507 of the information handling system 500. I/O hub 505 may also be coupled to a Super I/O chip 508, which is itself coupled to several of the I/O ports of the computer system, including keyboard 509 and mouse 510.

In one or more embodiments, a grid power system for distribution of electrical power at a site comprises a main breaker coupled to an electrical power source, a first switchgear unit coupled to the main breaker, one or more loads coupled to the first switchgear unit and one or more communications lines coupled to at least one of the first switchgear unit and the main breaker. In one or more embodiments, the main breaker comprises at least one of a switchgear and a current monitoring system. In one or more embodiments, the grid power system further comprises a main power distribution unit coupled to the main breaker and the first switchgear unit, wherein the main breaker is coupled to the first switchgear unit through the main power distribution unit. In one or more embodiments, the grid power system further comprises a second switchgear unit coupled to the first switchgear unit, wherein at least one of the one or more loads are coupled to the first switchgear unit through the second switchgear unit and a second one or more loads coupled to the second switchgear unit. In one or more embodiments, a grid power system further comprises a grid power unit coupled to the first switch gear unit, wherein at least one of the one or more loads are coupled to the first switchgear unit through the grid power unit and a third one or more loads are coupled to the second switchgear unit. In one or more embodiments, the main breaker comprises at least one of a switchgear and a current monitoring system. In one or more embodiments, the grid power system comprises a main power distribution unit coupled to the main breaker and the first switchgear unit, wherein the main breaker is coupled to the first switchgear unit through the main power distribution unit. In one or more embodiments, the grid power system further comprises a main power distribution unit coupled between the main breaker and the first switchgear unit, wherein the first switchgear unit couples to the main breaker through the main power distribution unit, a grid power unit coupled to the main power distribution unit and one or more fourth loads coupled to the main power distribution unit. In one or more embodiments, the first switchgear unit comprises at least one of an uninterruptable power supply, a computing system coupled to the uninterruptable power supply, a transformer, a heating, ventilation and air conditioning system coupled to the transformer.

In one or more embodiments, a grid power system for distribution of electrical power at a well site comprises a main breaker coupled to an electrical power source, one or more grid power units coupled to the main breaker and one or more loads coupled to the one or more grid power units. In one or more embodiments, the one or more grid power units are coupled to the main breaker via a main power distribution unit.

In one or more embodiments, a method for distributing electrical power at a site comprises coupling a main breaker to an electric power source, coupling a first switchgear unit to the main breaker, coupling one or more loads to the first switchgear unit, coupling one or more communication lines to at least one of the first switchgear unit and the main breaker. In one or more embodiments, the main breaker comprises at least one of a switchgear and a current monitoring system. In one or more embodiments, the method for distributing electrical power at a site comprises coupling a main power distribution unit to the main breaker and the first switchgear unit, wherein the main breaker is coupled to the first switchgear unit through the main power distribution unit. In one or more embodiments, the method for distributing electrical power at a site comprises coupling a second switchgear unit to the first switchgear unit, wherein at least one of the one or more loads are coupled to the first switchgear unit through the second switchgear unit and a second one or more loads coupled to the second switchgear unit. In one or more embodiments, the method for distributing electrical power at a site comprises coupling a grid power unit to the first switchgear unit, wherein at least one of the one or more loads are coupled to the first switchgear unit through the grid power unit and a third one or more loads are coupled to the second switchgear unit. In one or more embodiments, the main breaker comprises at least one of a switchgear and a current monitoring system. In one or more embodiments, the method for distributing electrical power at a site comprises coupling a main power distribution unit to the main breaker and the first switchgear unit, wherein the main breaker is coupled to the first switchgear unit through the main power distribution unit. In one or more embodiments, the method for distributing electrical power at a site comprises coupling a main power distribution unit between the main breaker and the first switchgear unit, wherein the first switchgear unit couples to the main breaker through the main power distribution unit, coupling a grid power unit to the main power distribution unit and coupling one or more fourth loads to the main power distribution unit. In one or more embodiments, the first switchgear unit comprises at least one of an uninterruptable power supply, a computing system coupled to the uninterruptable power supply, a transformer and a heating, ventilation and air conditioning system coupled to the transformer.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure.

What is claimed is:

1. A method of distributing electrical power for a well service operation at a well site, comprising:
providing electrical power from an at least one electrical power source to a main breaker, wherein the main breaker is a mobile unit mounted on a trailer or skid, wherein the main breaker includes a current monitoring system which monitors current at one or more output lines of the main breaker, wherein the main breaker is opened when the current at the one or more output lines equals or exceeds a preset current threshold;

providing electrical power by the main breaker to a transformer coupled to one of the one or more of the output lines of the main breaker, wherein the transformer provides a plurality of secondary outputs that are phase shifted relative to each other;

providing electrical power by a first secondary output of the transformer to a first electric pumping unit; and providing electrical power by a second secondary output of the transformer to a second electric pumping unit, wherein the second secondary output of the transformer is phase shifted relative to the first secondary output of the transformer.

2. The method of claim 1, wherein the first secondary output of the transformer is coupled to a first switchgear unit and wherein providing electrical power by the first secondary output of the transformer to the first electric pumping unit comprises providing electrical power by the first secondary output of the transformer to the first switchgear unit and the first switchgear unit providing electrical power to the first pumping unit.

3. The method of claim 2, further comprising grounding the transformer by a high-resistance grounding system.

4. The method of claim 1, further comprising controlling the main breaker at least in part via a communication line that couples the main breaker to a control center.

5. The method of claim 1, wherein the well service operation is a hydraulic fracturing well service operation.

6. The method of claim 1, wherein the at least one electrical power source comprises a local utility electrical power source.

7. The method of claim 1, wherein the at least one electrical power source comprises a turbine generator electrical power source and a local utility electrical power source.

8. A method of distributing electrical power for a well service operation at a well site, comprising:
providing electrical power from a mobile power generator electrical power source and from a local utility electrical power source to a main breaker, wherein the main breaker is a mobile unit mounted on a trailer or skid, wherein the main breaker includes a current monitoring system which monitors current at one or more output lines of the main breaker, wherein the main breaker is opened when the current at the one or more output lines equals or exceeds a preset current threshold;

providing electrical power by the main breaker to a transformer coupled to one of the one or more of the output lines of the main breaker;

providing electrical power by a first secondary output of the transformer to a first electric pumping unit; and providing electrical power by a second secondary output of the transformer to a second electric pumping unit.

9. The method of claim 8, wherein providing electrical power by the main breaker to the transformer comprises providing electrical power by the main breaker to a switchgear and providing electrical power by the switchgear to the transformer.

10. The method of claim 8, further comprising providing electrical power by the transformer to a blender power distribution unit and providing electrical power by the blender power distribution unit to a blender system.

11. The method of claim 8, further comprising the transformer providing electrical power to at least two different well sites at the same time.

12. The method of claim 8, further comprising grounding the transformer by a high-resistance grounding system.

13. The method of claim 8, further comprising controlling the main breaker at least in part via a communication line that couples the main breaker to a control center.

14. A method of distributing electrical power for a well service operation at a well site, comprising:
providing electrical power from at least two different electrical power sources to a main breaker, wherein the main breaker is a mobile unit mounted on a trailer or skid, wherein the main breaker includes a current monitoring system which monitors current at one or more output lines of the main breaker, wherein the main breaker is opened when the current at the one or more output lines equals or exceeds a preset current threshold;

providing electrical power by the main breaker to a transformer coupled to one of the one or more of the output lines of the main breaker; and providing electrical power by a secondary output of the transformer to a load.

15. The method of claim 14, wherein the well service operation is a hydraulic fracturing well service operation.

16. The method of claim 14, wherein the well service operation is a drilling well service operation.

17. The method of claim 14, wherein the electrical power provided by the main breaker to the transformer is in the range from about 12.47 kilovolts to about 34.4 kilovolts.

18. The method of claim 14, wherein the load comprises an electric pumping unit.

19. The method of claim 14, wherein the load comprises one or more blending units.

20. The method of claim 14, wherein the load comprises one or more proppant handling systems.

21. A method of distributing electrical power for a well service operation at a well site, comprising:
providing electrical power from an at least one electrical power source to a main breaker, wherein the main breaker is a mobile unit mounted on a trailer or skid, wherein the main breaker includes a current monitoring system which monitors current at one or more output lines of the main breaker, wherein the main breaker is opened when the current at the one or more output lines equals or exceeds a preset current threshold; and providing electrical power by the main breaker to a transformer coupled to one of the one or more of the output lines of the main breaker, wherein the transformer provides a plurality of secondary outputs that are phase shifted relative to each other where the phase-shifted outputs are used by a variable frequency drive on an electric pumping unit.

* * * * *